Figure 2:
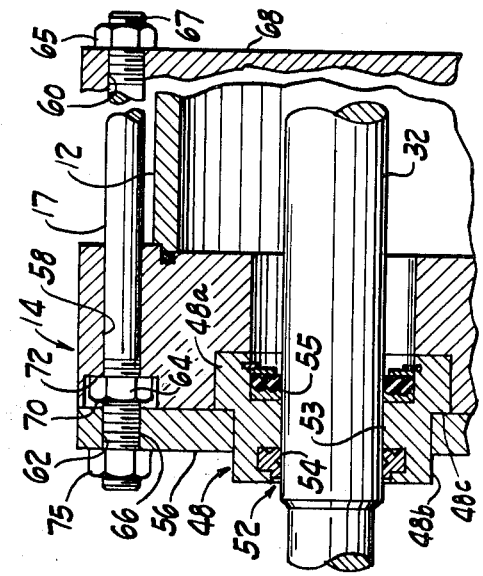

United States Patent

[11] 3,559,539

| [72] | Inventor | Joseph Nagy<br>Independence, Ohio |
|---|---|---|
| [21] | Appl. No. | 859,967 |
| [22] | Filed | Sept. 22, 1969 |
| [45] | Patented | Feb. 2, 1971 |
| [73] | Assignee | The S-P Manufacturing Corporation<br>Solon, Ohio |

[54] FLUID ACTUATOR CONSTRUCTION
3 Claims, 2 Drawing Figs.

| [52] | U.S. Cl.................................................. | 92/128, |
|---|---|---|
| | | 92/169, 308/15, 277/187 |
| [51] | Int. Cl...................................................... | F01b 29/00 |
| [50] | Field of Search............................................ | 92/128, |
| | | 169—171; 308/(Inquiry); 277/187 |

[56] References Cited
UNITED STATES PATENTS

| 825,832 | 7/1906 | Heisler.......................... | 92/170 |
| 3,395,620 | 8/1968 | Schmoeger.................... | 92/161 |

*Primary Examiner*—Martin P. Schwadron
*Assistant Examiner*—Allen M. Ostrager
*Attorney*—Watts, Hoffman, Fisher & Heinke ABSTRACT: A fluid actuator with improved end plate and tie rod construction to facilitate external removal of a rod bearing and rod seal cartridge. The cartridge is received in an external cavity in one end plate and is retained by a cover plate. The plates are secured by separate sets of nuts threaded on common tie rods that extend in nonthreaded engagement through aligned throughbores in the end plate and cover plate. The nuts that retain the end plate are recessed in counterbores in the end plate.

PATENTED FEB 2 1971          3,559,539

INVENTOR.
JOSEPH NAGY
BY Watts, Hoffmann
Fisher & Heinke
ATTORNEYS.

FLUID ACTUATOR CONSTRUCTION

This invention relates to fluid actuators and more particularly to an improved construction for fluid cylinders that have an externally removable rod bearing retained in an end plate by a retaining plate.

Certain fluid actuators of the cylinder and piston type utilize plates held in fluid-tight relationship against opposite ends of a tubular body by tie rods. A piston slides within the tubular body and a piston rod extends axially through one end plate. The rod slides in a rod bearing and rod seals are provided at the bearing to prevent fluid leakage. For convenience in assembly and to facilitate replacement, the bearing and seals are advantageously provided in the form of a cartridge that surrounds the piston rod and is received in a central aperture of the end plate through which the piston rod extends. Also for convenience in assembly of the cylinder and replacement of the cartridge, the cartridge is externally removable from the end plate and retained during use by a retaining plate that fits against the end plate. Heretofore, to permit removal of the retaining plate and cartridge without disassociating the end plates from the tubular body, the retaining plate has been screwed directly to the front end plate. To facilitate this, tapped holes have been provided on opposite sides of the end plate. Tie rods from the rear end plate extend along the tubular body and are threaded into tapped holes in the rearwardly facing surface of the front plate and machine screws receivable in the tapped holes of the forwardly facing surface separately attach the cover plate. This construction has proven expensive, primarily because of the tapping operations required in the end plate. In addition, the retaining plate and screws in no way contribute to the strength of the cylinder, except in retaining the cartridge.

In accordance with the present invention, a fluid actuator of the cylinder and piston type as described above has been provided which facilitates the use of a plate to retain an externally removable cartridge, permits the retaining plate to be removed from the end plate without disassociation of the end plate from the tubular body, and eliminates the need for tapped holes in the end plate, and in which the retaining plate contributes to the overall strength of the fluid cylinder. Briefly, this is accomplished by providing aligned throughbores in the front end plate and retaining plate for receiving tie rods in nonthreaded engagement, and by independently connecting the front end plate to the cylinder and the retaining plate to the end plate with separate nuts on the common tie rods. To this end, the tie rods extend through the front end plate and beyond the retaining plate and each rod has an externally threaded end portion including the portion of the tie rod beyond the retaining plate and a portion within the end plate. Each throughbore of the front end plate is counterbored at the surface against which the retaining plate abuts. A first nut is threaded on each tie rod, is received within a counterbore of the front end plate, and tensions the tie rod to retain the end plates of the cylinder against opposite ends of the tubular body. The retaining plate is held against the front end plate to retain the cartridge by an additional nut threaded on an extending portion of each tie rod, and the additional nuts further tension the tie rods. It will be apparent from this construction that (a) the end plate and the retaining plate can be secured without tapped holes, (b) the retaining plate can be easily removed to remove the cartridge from the front end plate without disturbing the end plates or tie rods, and (c) the retaining plate and additional nuts aid the recessed nuts in holding the end plates against the tubular body.

Figure 1:
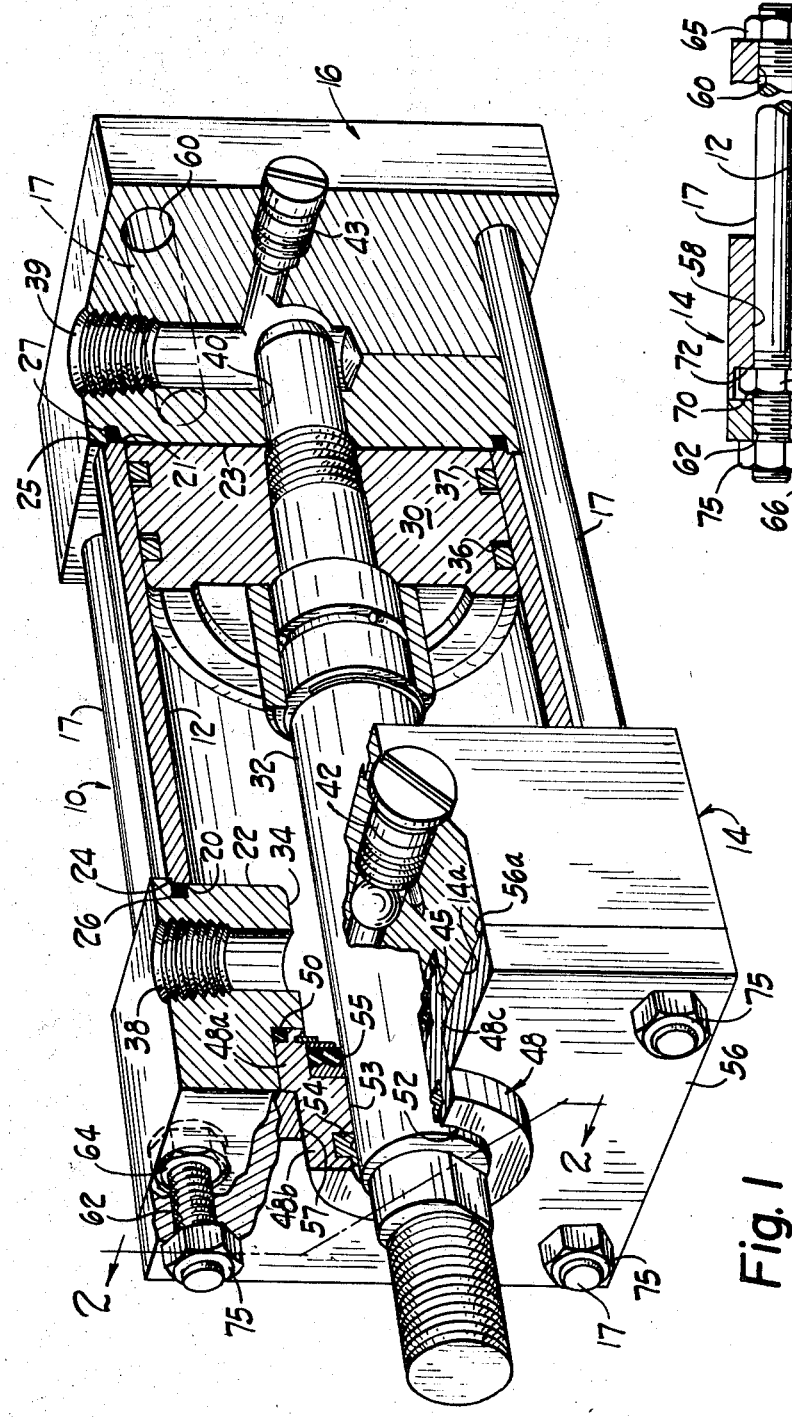

The above and other features and advantages of the present invention will become better understood from the following detailed description of a preferred embodiment of the invention, when considered in connection with the accompanying drawings, in which:

FIG. 1 is a perspective view with parts cut away showing a fluid actuator embodying the present invention; and FIG. 2 is a partial longitudinal sectional view of the actuator of FIG. 1 taken along the line 2–2.

With reference now to the drawings, a fluid actuator of the double-acting cylinder and piston type embodying the present invention is indicated generally by reference numeral 10. The cylinder part of the actuator 10 is formed by a cylindrical tube 12, a front end plate 14 and a rear end plate 16. Four tie rods 17 connect the end plates and hold them tightly against opposite ends of the cylinder tube 12 in a manner to be described in more detail. End surfaces 20, 21 of the cylinder tube are received in cylindrical recesses 22, 23, respectively, in the inwardly facing surfaces of the end plates 14, 16. Shoulders 24, 25 of the tube adjacent the end surfaces abut the end plates. A fluid-tight seal is established between the tube and end plates by end seals 26, 27.

A piston 30 slides within the tube 12 and has an attached piston rod 32, which extends through a central aperture 34 of the front end plate 14. Piston packings 36, 37 provide an effective sliding fluid seal between the piston and cylinder. A port 38 in the front end plate 14 communicates to the cylinder 12 on one side of the piston 30 through the central aperture 34 and a port 39 in the rear end plate 16 communicates to the cylinder 12 on the opposite side of the piston 30 through a central axial passage 40. Cushion check and adjustment seals 42, 43 are provided in the end plates 14, 16 respectively in communication with the aperture 34 and passage 40.

The aperture 34 of the front end plate 14 is counterbored at the front flat surface 14a of the plate, forming a recess 45. A cartridge 48 that acts as a piston rod bearing and seal is partially received within the recess 45. The cartridge has a cylindrical base portion 48a that fits closely within the recess 45, a smaller diameter cylindrical portion 48b that extends forwardly from the base portion and a radial shoulder portion 48c between the two cylindrical portions, positioned to be located flush with the surface 14a of the end plate 14 when the cartridge is seated in the recess 45. An O-ring 50 between the base portion of the cartridge and the recess 45 provides a fluid-tight seal between the cartridge and end plate. The cartridge has a central aperture 52 that receives the piston rod 32 and includes a bearing surface 53 and piston rod seals 54, 55.

A retaining plate 56 fits against the front surface 14a of the front end plate 14, has a central aperture 57 that closely surrounds the smaller diameter cylindrical portion 48b of the cartridge 48 and has a flat inner surface 56a that fits flush against the end plate surface 14a and in part abuts the shoulder portion 48c of the cartridge to retain the cartridge in the recess 45. Four apertures or throughbores 58 are formed at spaced locations in the front end plate 14 about the periphery (adjacent corner portions of the rectangular end plate 14 shown), four throughbores 60 are formed in the rear end plate 16, and four throughbores 62 are formed in the retaining plate, all similarly placed to those in the front end plate and aligned with each other to receive the tie rods 16.

Each tie rod 16 clamps the end plates 14, 16 against opposite ends of the tube 12 with tie rod nuts 64, 65 on threaded end portions 66, 67 of the tie rods. The nuts 65 abut a rear surface 68 of the rear end plate 16 and the nuts 64 are received in a recess 70 counterbored in the face 14a of the front end plate and bear against a shoulder 72. The tie rods are received with a clearance fit within the throughbores 58 and 60 of the end plates, and also within the throughbores 62 of the retaining plate. The retaining plate 56 is held against the shoulder 48c of the cartridge 48 and against the end face 14a of the front end plate by retainer plate nuts 75 threaded on extending parts of the threaded end portions 66 of the tie rods. With this arrangement, with the parts assembled, the tie rods 17 are tensioned by the tie rod nuts 64, 65 to clamp the front and rear end plates 14, 16 against the opposite ends of the tube 12; the nuts 64 are recessed so that the retaining plate 56 fits flush against the end plate 14 and cartridge 48; and the nuts 75 act not only to hold the retaining plate and cartridge against the front end plate, but also further tension the tie rods and restrain separation of the end plates 14, 16. When it is necessary to replace the cartridge 48 the retaining plate 56 can be removed by removing the four nuts 75 without affecting the relationship among end plates 14 and 16 and the cylinder 12.

While a preferred embodiment of the invention has been described in detail, it will be readily apparent that various modifications and alterations can be made therein without departing from the spirit and scope of the invention.

I claim:

1. In a fluid actuator having a tubular body portion, a reciprocable piston within the body, an end plate at one end of the tubular body, an aperture through said end plate, a piston rod secured to said piston and extending through said aperture, a retaining plate against an outer face of said end plate, a bearing sleeve surrounding said piston rod adjacent said end plate and retained adjacent said end plate by said retaining plate, tie rods along said tubular body portion securing said end plate thereto, the improvement comprising aligned throughbores through said end plate and retaining plate through which said tie rods extend with a clearance fit, a recess at each throughbore at the interface between said retaining face and outer face of said end plate, external threads on said tie rods along portions extending within said recesses and along portions beyond said retaining plate, nuts threaded on said tie rods and located in said recess acting against said end plate to secure said end plate against the tubular body, and additional nuts threaded on said tie rods, located beyond said retaining plate, and acting against the retaining plate to secure it against said end plate, whereby said retaining plate and bearing sleeve can be removed without disassociating said end plate from the tubular body and the retaining plate and additional nuts aid the recessed nuts in holding said end plate against the tubular body.

2. In a fluid actuator having a tubular body portion, a reciprocable piston within the body, an end plate at one end of the tubular body, an aperture through said end plate, a piston rod secured to said piston and extending through said aperture, an externally removable cartridge at least partially received in said end plate, a central aperture through said cartridge through which said piston rod extends, tie rods along said tubular body portion securing said end plate thereto, and a retaining plate face-to-face against the end plate retaining the cartridge in the end plate, the improvement comprising throughbores in said end plate through which said tie rods extend in nonthreaded relationship with a clearance fit, throughbores in said retaining plate aligned with the throughbores in the end plate and through which said tie rods extend in nonthreaded relationship with a clearance fit, recesses in at least one of the facing surfaces of said end plate and retaining plate at the openings of the throughbores, external threads on portions of said tie rods including those portions located within said recesses and beyond the external surface of the retaining plate, said recesses being of sufficient depth to fully receive a nut between said plates and threaded on a tie rod, first nuts within the recesses on threaded portions of the tie rods and acting against the end plate, and second nuts on threaded portions of the tie rods beyond the retaining plate and acting against the retaining plate.

3. In a fluid actuator having a tubular body, a reciprocable piston within the body, end plates at opposite ends of the tubular body, an aperture through one of said end plates, an externally removable cartridge at least partially received in a portion of said aperture, a piston rod secured to said piston and extending through said cartridge, tie rods securing said end plates together and against opposite ends of the tubular body and a retaining plate held against said one of said end plates to retain the cartridge in said aperture, the improvement comprising a plurality of nonthreaded throughbores in said one end plate for receiving the tie rods, said throughbores being counterbored at the surface against which the retaining plate is held, a plurality of nonthreaded throughbores in said retaining plate aligned with the throughbores of said one end plate, said tie rods extending through the aligned throughbores of said one end plate and said retaining plate, external threads on said tie rods at least along portions of each tie rod within said counterbores and beyond said retaining plate, a first nut on a threaded portion of each tie rod within each said counterbore and seated against said one end plate to tension the associated tie rod, and a second nut on a threaded portion of each said tie rod that extends beyond the retaining plate securing said retaining plate to said one end plate.